W. E. MOORE.
PROCESS AND APPARATUS FOR MANUFACTURING STEEL AND STEEL ALLOYS.
APPLICATION FILED NOV. 19, 1918.
1,335,009.  Patented Mar. 30, 1920.
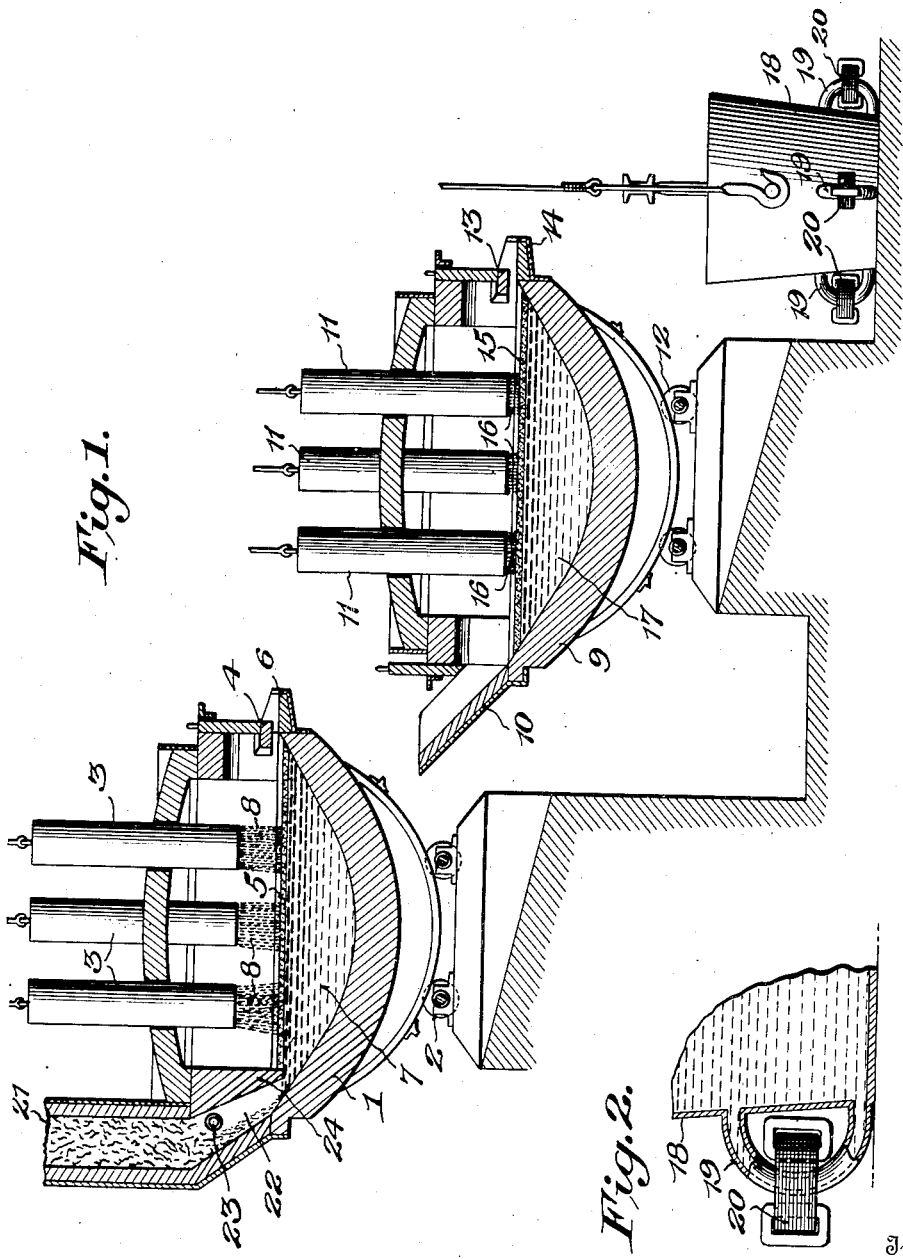
Inventor
William E. Moore,
By  L. A. Stanley
his Attorneys

UNITED STATES PATENT OFFICE.

WILLIAM E. MOORE, OF PITTSBURGH, PENNSYLVANIA.

PROCESS AND APPARATUS FOR MANUFACTURING STEEL AND STEEL ALLOYS.

1,335,009.    Specification of Letters Patent.    Patented Mar. 30, 1920.

Application filed November 19, 1918. Serial No. 263,156.

*To all whom it may concern:*

Be it known that I, WILLIAM E. MOORE, citizen of the United States, residing at Pittsburgh, in the county of Allegheny and State of Pennsylvania, have invented certain new and useful Improvements in Processes and Apparatus for Manufacturing Steel and Steel Alloys, of which the following is a specification.

My invention relates to the process of melting and refining metals, as for instance, in the manufacture of high grade steel, either from pig metal or from scrap metal, the invention consisting in the process for carrying out such manufacture as well as in the apparatus therefor.

The object of my invention is to provide a process of low cost by which metal may be melted or melted and refined and superheated, so that high grade product, as for instance, iron or steel for forging, rolling or casting, may be rapidly and economically manufactured, owing to the novel steps for melting, eliminating impurities, superheating or alloying in succession, all with the minimum cost of heat energy and with the minimum maker's cost for the maintenance.

A further object of my invention is to provide apparatus for the carrying out of the process, consisting of a plurality of electric furnaces, preferably having a cascade arrangement, and also including means for effecting a preliminary heating and a partial melting of the cold charge.

Other objects and advantages will appear in the following specification, and the novel features of the invention will be particularly pointed out in the appended claims.

My invention is illustrated in the accompanying drawings, forming part of this application, in which—

Figure 1 represents in cascade arrangement, a series of electric furnaces and an induction ladle for carrying out my invention; and Fig. 2 is a detail fragmentary section of said ladle.

In carrying out my invention with the apparatus here shown, I introduce the metal to be melted into a furnace 1, mounted upon rollers 2 for tilting by power applied in any desired way. This furnace is provided with three arcing electrodes 3, which extend vertically through the furnace roof and are vertically adjustable in the usual or any desired way, said arcs being connected preferably in a three-phase power circuit, though it should be understood that my present invention is not limited to a power circuit of any particular phase, or to any special number of electrodes.

This furnace is preferably provided with a skimmer arch 4, which retains the slag 5 within the furnace when tipped for pouring from the spout 6, said slag being retained wholly or partially for the treatment of the next succeeding charge. In this furnace I employ a slag containing lime and oxid of iron, such as iron ore or metal scale, so that this slag will have a decidedly oxidizing influence on the metal bath 7 beneath, thereby eliminating phosphorus, silicon and carbon.

In this furnace, on account of the heat conductivity of the slag, the comparatively low temperature, the protective smoke bank present, and by reason of the great area that may be beneficially affected by the arcs, I employ long arcs 8 between the electrodes and the path, thus rapidly heating up the mix and maintaining it heated until the slag has properly reacted upon the metal bath to eliminate the deleterious elements.

After having undergone the treatment above described in furnace 1, the metal is transferred from this furnace to a second furnace 9 by tilting the furnace 1 so that the metal will be discharged from its spout into the runner 10 communicating with the charging opening of furnace 9. The latter furnace, like furnace 1, is provided with three arcing electrodes 11 vertically adjustable, as described with regard to electrodes 3; is mounted upon suitable rollers 12 for tilting; and is provided with a skimmer arch 13, and pouring spout 14, in addition to other parts which need not be mentioned.

The slag 15 in this latter furnace is deoxidizing, being preferably mainly of lime and carbon. In this furnace, the sulfur is removed and enters the slag, and any superfluous oxid is reduced by the carbon in the slag. On account of the minimum protective smoke bank present and the reflective nature of the slag in the furnace 9, and the high heat required to melt it, as well as the extreme non-conductivity of the slag itself, I employ short arcs 16 between the electrodes and the bath for the purpose of heating the slag and metal, such arcs resulting not only in greater economy in power consumption, but also in a considerable saving to the furnace refractories, owing to the intense heat to which they are subjected by reflection from the slag, this heat being much higher than in furnace 1.

After a considerable time, the furnace 9 is tilted, and the metal 17 therein poured from the spout 14 into a furnace or ladle 18, in which the finishing operations are performed, such, for example, as superheating, as the addition of ferro-manganese, ferrosilicon, ferro-chrome, and like additions for producing special steels. This ladle is provided with a plurality of electric heating means as, for instance, circulating ducts 19 forming, in association with coils 20, inductive loops whereby the bath within the ladle 18 is maintained limpid, and so agitated as to obtain a thorough mixing of its contents, or by electric arcs as in 16. By thus mixing the above-mentioned contents in ladle 18, the loss of elements which ordinarily occurs by their mixing with the slag in the furnace is prevented, while at the same time, not delaying the furnace operation while the alloys are being gotten up to the proper heat and analysis for pouring.

My invention also contemplates the pre-heating of the charge, and the melting of more or less of the same, before it goes into the furnace 1, by fuel such as gas, which may be procured from any source as, for instance, producer gas supply, or oil, and thereby effect a saving in the cost of electrical power. For this purpose, furnace 1 may be provided with a vertical charging shaft 21 lined with suitable refractory material and communicating at its lower end through a suitable throat 22 with the interior of furnace 1, and one or more gas nozzles 23 arranged to direct their flame in said throat so as to heat the charge, which passes downward by gravity counter to the products of combustion from the burners.

The charging opening of furnace 1 may be spanned by an arch 24 which prevents the slag from covering the metal at the lower end of throat 22 and allows the molten metal itself to form a seal for said throat. The molten metal heated by the arcs dissolves at this point the partially melted scrap as it enters the bath.

While I have herein shown and described this pre-heating arrangement in conjunction with a certain process and arrangement of furnaces, it should be understood that it may be employed independently thereof.

I claim:

1. In the manufacture of steel or steel alloys, the process which consists in subjecting a metal in a furnace to an electric arc in the presence of a slag, transferring the molten metal to another furnace and there subjecting it to the heat of a shorter electric arc in the presence of a slag of a different character from that of the first-mentioned slag.

2. In the manufacture of steel or steel alloys, the process which comprises treating a metal containing eliminable products under oxidizing conditions in an electric furnace with a slag having oxidizing properties, and operating upon the furnace contents with a long arc, transferring the metal to a second electric furnace and operating thereon with a shorter arc in the presence of a slag having deoxidizing properties.

3. In the manufacture of steel or steel alloys, the process which consists in subjecting a metal in a furnace to an electric arc in the presence of a slag, transferring the molten metal to another furnace and there subjecting it to the heat of a shorter electric arc in the presence of a slag of a different character from that of the first-mentioned character, and finishing the metal by additions in slag, in a separate container, while maintaining a hydrostatic circulation therein.

4. The combination with a tilting furnace, of a cold metal supply shaft, communicating at its lower end with the furnace hearth, and positioned to be sealed by the molten material in the furnace, and means near the bottom of said shaft to supply a heating gas to the material therein.

5. The herein described steps in a process of manufacturing steel or steel alloys, which consists in melting the charge, maintaining the charge in melted condition in the presence of an oxidizing agent, and subsequently increasing the temperature while the charge is in the presence of a de-oxidizing agent.

6. The herein-described steps in a process of manufacturing steel or steel alloys, which consists in melting the charge, maintaining the charge in melted condition in the presence of an oxidizing slag, and subsequently increasing the temperature while the charge is in the presence of a de-oxidizing slag.

7. The herein-described steps in a process of manufacturing steel or steel alloys, which consists in melting the charge, maintaining the charge in melted condition in the presence of an oxidizing slag at a temperature sufficient to eliminate phosphorus, silicon, and carbon, and subsequently increasing the temperature while the charge is in the presence of a de-oxidizing slag to eliminate sulfur.

8. The herein-described steps in a process of manufacturing steel or steel alloys, which consists in melting the charge, maintaining the charge in melted condition in the presence of an oxidizing slag at a temperature sufficient to eliminate phosphorus, silicon, and carbon, increasing the temperature while the charge is in the presence of a de-oxidizing slag to eliminate sulfur, and subsequently adding, to the molten charge, alloys, and agitating the mixture while in its limpid condition.

9. The combination with a tilting furnace, of a cold metal supply shaft, communicating at its lower end with the furnace hearth, and positioned to be sealed by the molten material in the furnace, means near the bottom of said shaft to supply a heating gas to the material therein, a plurality of electrodes disposed in position to arc above the bath, and a discharge spout on the opposite side of the furnace from the cold metal supply shaft.

10. The herein described steps in the process of manufacturing steel or steel alloys, which consists in preheating the cold metal as it is being fed to an electric furnace by means of gas, sealing the preheated metal and gas from the furnace chamber by a bath, thereby completing the liquefaction of the gas-heated metal by solution in the bath at the point of sealing, and subsequently maintaining the metal in melted condition in the presence of an oxidizing agent.

11. The herein described steps in the process of manufacturing steel or steel alloys, which consists in preheating the cold metal as it is being fed to an electric furnace by means of gas, sealing the preheated metal and gas from the furnace chamber by a bath, thereby completing the liquefaction of the gas-heated metal by solution in the bath at the point of sealing, maintaining the metal in melted condition in the presence of an oxidizing agent, and subsequently increasing the temperature while the charge is in the presence of a deoxidizing agent.

In testimony whereof I affix my signature.

WILLIAM E. MOORE.